(12) United States Patent
Packiarajan (10) Patent No.: US 10,882,259 B2
(45) Date of Patent: Jan. 5, 2021

(54) MANUFACTURING METHOD FOR AN AESTHETIC STRUCTURAL PART (71) Applicant: THERMO KING CORPORATION, Minneapolis, MN (US)

(72) Inventor: Selvam Packiarajan, Eden Prairie, MN (US)

(73) Assignee: Thermo King Corporation, Minneapolis, MN (US)

(*) Notice: Subject to any disclaimer, the term of this patent is extended or adjusted under 35 U.S.C. 154(b) by 445 days.

(21) Appl. No.: 15/611,066

(22) Filed: Jun. 1, 2017

(65) Prior Publication Data
US 2018/0345601 A1 Dec. 6, 2018

(51) Int. Cl.
B29C 45/14 (2006.01)
B29C 69/02 (2006.01)
B32B 27/08 (2006.01)
B32B 27/30 (2006.01)
B32B 27/36 (2006.01)
(Continued)

(52) U.S. Cl.
CPC .......... B29C 69/02 (2013.01); B29C 45/1418 (2013.01); B32B 27/08 (2013.01); B32B 27/302 (2013.01); B32B 27/365 (2013.01); B29C 45/14688 (2013.01); B29C 51/14 (2013.01); B29C 51/264 (2013.01); B29C 51/266 (2013.01); B29C 2045/14155 (2013.01); B29K 2055/02 (2013.01); B29K 2069/00 (2013.01); B29K 2105/08 (2013.01);
(Continued)

(58) Field of Classification Search
None
See application file for complete search history.

(56) References Cited

U.S. PATENT DOCUMENTS 3,631,580 A 1/1972 Swartz
3,940,468 A 2/1976 Tunstall
(Continued)

FOREIGN PATENT DOCUMENTS

DE 102009022542 12/2010
DE 102015208945 * 11/2016
(Continued)

OTHER PUBLICATIONS

English machine translation of DE102015208945 provided by google patents (Year: 2016).*
(Continued)

Primary Examiner — Edmund H Lee
(74) Attorney, Agent, or Firm — Hamre, Schumann, Mueller & Larson, P.C.

(57) ABSTRACT

An aesthetic structural product is provided that incorporates high structural strength and high-gloss finish through a streamlined manufacturing process combining hybrid molding with an overlay of decorative film. The method includes preheating a composite sheet, applying a decorative film to the composite sheet through hot stamping, thermoforming the composite sheet to a desired shape, and overmolding desired features using a resin which is compatible with the composite of the composite sheet. The method may be performed in varying order, such as overmolding and/or thermoforming the composite sheet prior to hot-stamping the decorative film to the composite sheet.

11 Claims, 5 Drawing Sheets (51) Int. Cl.
  *B29C 51/26* (2006.01)
  *B29C 51/14* (2006.01)
  *B29L 31/00* (2006.01)
  *B29K 105/12* (2006.01)
  *B29K 55/02* (2006.01)
  *B29K 69/00* (2006.01)
  *B29K 105/08* (2006.01)

(52) U.S. Cl.
  CPC ..... *B29K 2105/12* (2013.01); *B29L 2031/737* (2013.01); *B29L 2031/74* (2013.01)

(56) References Cited

U.S. PATENT DOCUMENTS

| | | | |
|---|---|---|---|
| 4,051,290 A | 9/1977 | Jutte et al. | |
| 4,078,395 A | 3/1978 | Crowe et al. | |
| 4,182,134 A | 1/1980 | Viegas et al. | |
| 4,310,192 A | 1/1982 | FitzGerald | |
| 4,349,643 A | 9/1982 | Mohiuddin | |
| 4,356,230 A | 10/1982 | Emanuel et al. | |
| 4,551,986 A | 11/1985 | Anderson et al. | |
| 4,610,835 A | 9/1986 | Ghavamikia | |
| 4,615,057 A | 10/1986 | Favreau | |
| 4,727,728 A | 3/1988 | Brown | |
| 4,781,876 A | 11/1988 | Kia | |
| 4,902,557 A * | 2/1990 | Rohrbacher | B32B 27/08 428/215 |
| 4,959,189 A * | 9/1990 | Rohrbacher | B29C 51/16 264/510 |
| 5,000,903 A | 3/1991 | Matzinger et al. | |
| 5,051,310 A | 9/1991 | Horn et al. | |
| 5,087,405 A | 2/1992 | Maker | |
| 5,639,536 A * | 6/1997 | Yamazaki | B29C 45/1418 428/141 |
| 5,662,996 A | 9/1997 | Jourquin et al. | |
| 6,117,384 A | 9/2000 | Laurin et al. | |
| 6,132,662 A | 10/2000 | Preisler et al. | |
| 6,440,546 B1 * | 8/2002 | Fields | B29C 37/0025 428/220 |
| 6,620,371 B1 * | 9/2003 | Winget | B29C 43/021 264/138 |
| 6,696,160 B2 | 2/2004 | Partusch et al. | |
| 6,745,470 B2 | 6/2004 | Foster et al. | |
| 7,445,836 B2 | 11/2008 | Yamane et al. | |
| 8,033,521 B2 | 10/2011 | Khan et al. | |
| 8,807,628 B1 | 8/2014 | Pfaff | |
| 2007/0269671 A1 * | 11/2007 | Hirschfelder | B29C 45/1418 428/542.6 |
| 2009/0126854 A1 | 5/2009 | Khan | |
| 2010/0007045 A1 * | 1/2010 | Hsu | B29C 45/1418 264/219 |
| 2012/0003454 A1 | 1/2012 | Younes et al. | |
| 2012/0148803 A1 | 6/2012 | Schleiermacher et al. | |
| 2016/0144542 A1 * | 5/2016 | Doan | B32B 3/10 264/129 |
| 2017/0314838 A1 | 11/2017 | Packiarajan | |

FOREIGN PATENT DOCUMENTS

| | | |
|---|---|---|
| GB | 2010169 | 6/1979 |
| JP | S57129731 | 8/1982 |
| JP | S59202834 | 11/1984 |
| JP | H05131489 | 5/1993 |
| JP | H05329882 | 12/1993 |

OTHER PUBLICATIONS

European Search Report issued in corresponding European Application No. 18175503.4 dated Jul. 24, 2018 (9 pages).
Leonhard Kurz Stiftung & Co: "Insert Molding by Leonhard Kurz", Sep. 2016, XP002782636, retrieved from the Internet: https://www.youtube.com/watch?v=fM2mX18pfsk.
Hui Boon Kwa: "Ineos Styrolution Helps Seoyon E-HWA Bring Brilliance to the Front Grill of Hyundai's New Kia K5"; Ineos Styrolution, Jun. 2016, XP-002782637, Retrieved from the Internet: https://www.ineos-styrolution.com/INTERSHOP/static/WFS/Styrolution-Portal_Site/-/Styrolution-Portal/it_IT/News%20and%20media/download/Hyundai_PR_17_06_2016.pdf.
European Search Report, issued in the corresponding European patent application No. 18175503.4, dated Aug. 20, 2019, 5 pages.
U.S. Appl. No. 16/565,031, filed Sep. 9, 2019, 24 pages.
Thermo King: "Specification Sheet; Precedent S-600"; Ingersoll Rand, pp. 1-2.
U.S. Appl. No. 15/142,592, filed Apr. 29, 2016 (24 pages).

* cited by examiner

MANUFACTURING METHOD FOR AN AESTHETIC STRUCTURAL PART

FIELD

This description is generally related to manufacturing methods for efficiently producing an aesthetic structural part combining suitable strength with an attractive appearance and embodiments of an aesthetic structural part for use as, for example, an enclosure for a transport refrigeration unit.

BACKGROUND

Plastic parts, such as those used as an enclosure for a transport refrigeration unit, often are modified to improve the appearance of an overall product, such as providing attractive finished surfaces such as high-gloss color or metallic or metallic-appearing surfaces such as a polished chrome appearance.

BRIEF SUMMARY

This description is generally related to manufacturing methods for efficiently producing an aesthetic structural part combining suitable strength with an attractive appearance and embodiments of an aesthetic structural part for use as, for example, an enclosure for a transport refrigeration unit.

A simplified method for forming parts having both aesthetic and structural requirements is provided. The method can include: applying a decorative layer to a composite sheet; using overmolding to provide functional components; and thermoforming the composite sheet. The embodiments described herein can reduce the number of steps and the number of machines required to make the aesthetic structural part. For example, this embodiments described herein can remove the need to trim and fit parts which are manufactured separately from one another. The reduction in steps can also reduce the risk of damage to the aesthetic structural part during manufacture, thereby improving yields. The embodiments described herein can also avoid the introduction of weak points such as at points of adhesion where materials can peel or where mechanical fasteners can provide weak points or damage the aesthetic structural part through being over-tightened.

In one embodiment, a method for manufacturing a structural and aesthetic part is provided. The method includes thermoforming a composite sheet, hot-pressing a decorative layer to the composite sheet, and overmolding a thermoplastic material onto the composite sheet.

In an embodiment, the decorative layer comprises a top layer, a pigmented layer and an adhesion layer. In an embodiment, the pigmented layer includes a metallic particle.

In an embodiment, the composite sheet comprises a resin and fibers. In an embodiment, the resin is acrylonitrile-butadiene-styrene, polycarbonate, or acrylonitrile styrene acrylate. In an embodiment, the fibers are glass fibers. In an embodiment, the fibers are carbon fibers.

In an embodiment, the thermoplastic material comprises acrylonitrile-butadiene-styrene, polycarbonate, or acrylonitrile styrene acrylate. In an embodiment, overmolding the thermoplastic material onto the composite sheet comprises forming one or more mounting features.

In an embodiment, all steps of the method are performed on a single injection molding machine having a heating element.

The individual steps of thermoforming the composite sheet, hot-pressing the decorative layer to the composite sheet, and overmolding a thermoplastic material onto the composite sheet may be performed in any order and steps may be performed multiple times during formation of the aesthetic structural part.

In another embodiment, an aesthetic structural plastic part is provided. The aesthetic structural part includes a decorative layer, a composite sheet, and a thermoplastic material. The thermoplastic material has one or more functional components formed in the thermoplastic material.

In an embodiment, the functional components are mounting features. In an embodiment, those mounting features are screw holes.

DETAILED DESCRIPTION

A structural aesthetic part may be manufactured through a process that includes hot-stamping a decorative film to a composite sheet, and overmolding the composite sheet with a thermoplastic material to form functional components, such as mounting features. This can provide simpler manufacturing while providing strong composite parts which still offer a visually appealing exterior surface. The products of this process may be used, for example, for the exterior of transport refrigeration units.

Figure 1:
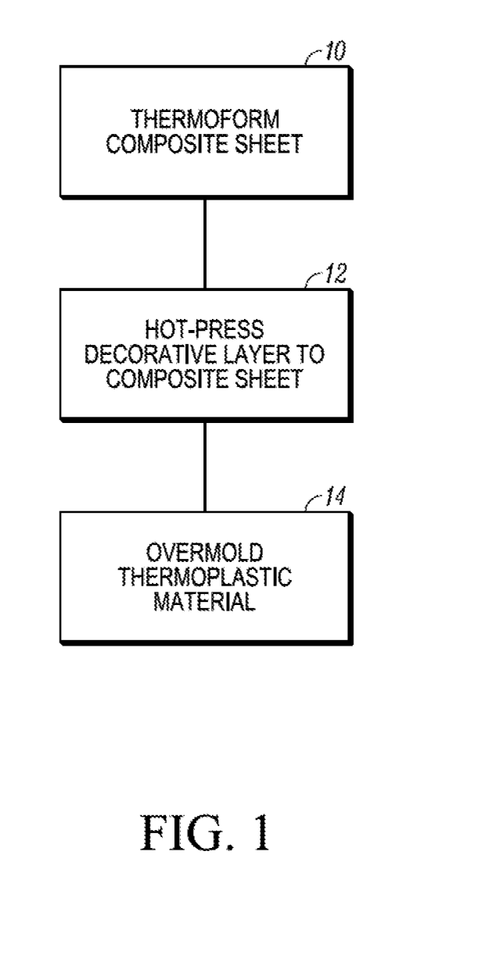
FIG. 1 is a flowchart showing a method of manufacturing aesthetic structural parts.

FIG. 1 is a flowchart showing the process of a method for forming an aesthetic structural part. A composite sheet is thermoformed at 10. A decorative layer is hot-pressed to the composite sheet at 12. A thermoplastic material is overmolded onto the composite sheet at 14.

A composite sheet is thermoformed at 10. The thermoforming comprises heating the composite sheet and bending it into a desired shape. The desired shape may be, for example, a curved surface for use on a front enclosure of a transport refrigeration unit. The desired shape can be based on the shape of the part to be produced. The particular tooling used can determine the shape of the thermoformed composite sheet. The heating of the composite sheet may be performed by a heating element included in an injection molding machine. The temperature to which the composite sheet is heated during thermoforming may be based on the particular materials used in the composite sheet and the properties of those materials, such as glass transition temperatures, melting points, etc. for the resin material or materials. The heated composite sheet can be pressed in the tooling to form the desired shape and cooled in the tooling to a temperature where the composite sheet is again rigid. In an embodiment, the thermoforming of the composite sheet can create features for mechanically interfacing the composite sheet and the overmolded thermoplastic material.

The composite sheet may include a resin and fibers. The composite sheet may be generally planar in shape prior to thermoforming at 10. The composite sheet is able to be thermoformed. The resin may be a thermoplastic resin, such as acrylonitrile-butadiene-styrene (ABS), polycarbonate, acrylonitrile styrene acrylate (ASA), or other thermoplastic materials. The fibers may be, for example, carbon fibers, glass fibers, etc. The fibers may be continuous fibers. The fibers may be woven in a pattern or nonwoven. In an embodiment, multiple different types of resins and/or fibers may be used in the composite sheet. For example, the composite may include glass and/or carbon fibers. The composite may include a fabric of roving glass, filament glass, or carbon. The composite may include a thermoplastic matrix of, for example, polypropylene, polyamide, or polycarbonate. The composite sheet may be selected to provide structural strength and/or impact resistance to the manufactured part, for example, for a cabinet door for an enclosure of a transport refrigeration unit. The fibers and the resin may each be selected based on the required mechanical properties for the application in which the part may be used.

A decorative layer is hot-pressed to the composite sheet at 12. The hot-pressing includes placing the decorative layer in contact with the composite sheet, and applying pressure at a temperature for a period of time. For example, the processing temperature may be around 300° C. The pressure used may be, for example, between approximately 1000 psi and approximately 5000 psi. The temperature at which the hot-pressing is carried out may be based on the materials used in the composite sheet and the material or materials used in the decorative layer. The decorative layer may be hot-pressed to a side of the composite sheet opposite the side of the composite sheet to which functional components have been overmolded to at 14.

The decorative layer may be, for example, a film or a foil. The decorative layer may have a colored gloss appearance, such as a gloss black or gloss white. The decorative layer may have a metallized appearance such as chrome. In an embodiment, the decorative layer includes a metal foil. In an embodiment, the decorative layer is a polymer film containing embedded particles of metal. The decorative layer may include one or more layers. The layers may include an adhesion layer, a pigmented layer and a top layer. In an embodiment, the decorative layer initially includes a carrier layer which is peeled off. There may be multiple layers between the adhesion layer and the top layer, for example a release layer and a functional layer both between the adhesion layer and the top layer.

A thermoplastic material is overmolded to the composite sheet to produce structural features at 14. The thermoplastic material may be, for example, acrylonitrile-butadiene-styrene (ABS), polycarbonate, or acrylonitrile styrene acrylate (ASA), polyamide, polypropylene, etc. The thermoplastic material may be short-fiber reinforced, for example using carbon or glass short fibers. The thermoplastic material is suitable for injection molding. The thermoplastic material may be selected for compatibility with at least the resin used in the composite sheet, to facilitate direct chemical bonding of the overmolded thermoplastic material to the composite sheet. In an embodiment, the thermoplastic material can be the same material as the resin used in the composite sheet. The overmolding at 14 may cover some or all of a side of the composite sheet.

The overmolding at 14 includes injection molding a thermoplastic material to form the thermoplastic material onto the composite sheet and forming functional components in the thermoplastic material. The overmolding at 14 may be performed on a side of the composite sheet opposite from the side to which the decorative layer is applied at 12.

The shaping of the thermoplastic material that is overmolded to the composite sheet may provide one or more functional components on a side of the manufactured part. The functional components may be, for example, mounting features for mounting the part, such as portions of hinges, screw-holes, or other elements of mechanical connections between the manufactured part to affix the part to a device or system incorporating the part. The functional components may be features used for provide functionality to the part, such as a catch for a latch, for example to allow a door of a transport refrigeration system enclosure to be kept in a closed position. Functional components formed by overmolding may also include ribs, providing additional stiffness to the part, or bosses for the addition of metal inserts in order to attach other parts. The tooling used in an injection molding machine may be used to determine the functional components molded into the overmolded thermoplastic material.

In the overmolding process at 14, the thermoplastic material may be directly chemically bonded to the composite sheet, for example, through bonding between the thermoplastic material and the resin used in the composite sheet. This can eliminate the need for fasteners or adhesives to connect the functional components to the remainder of the part. In an embodiment, the thermoplastic material may also be mechanically held in place by features of the thermoformed composite sheet such as notches or grooves.

While the embodiment shown in FIG. 1 presents one possible order for the manufacturing of an aesthetic structural part, hot-pressing the decorative layer to the composite sheet at 12, thermoforming the composite sheet at 10, and overmolding the composite sheet with functional components at 14 may be performed in any order. Additionally thermoforming the composite sheet at 10, hot-pressing the decorative layer at 12, and overmolding the thermoplastic material at 14 may be performed repeatedly or broken into parts which are performed at separate times. For example, some functional components may be overmolded to the composite sheet, then the composite sheet thermoformed, then additional functional components overmolded to the composite sheet. These steps may also be performed concurrently, for example hot-pressing the decorative layer 12 while the composite sheet is thermoformed 10.

Figure 2:
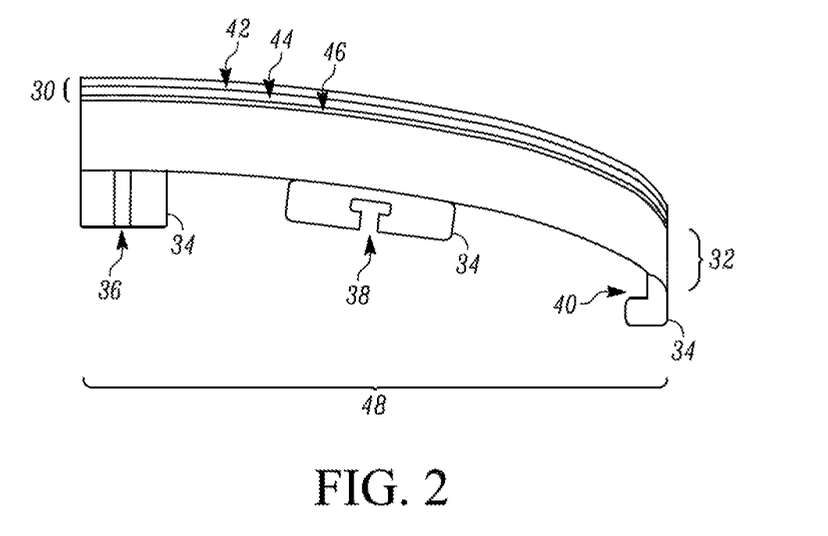
FIG. 2 is a cross-sectional view showing an aesthetic structural part manufactured according to the method of FIG. 1.

FIG. 2 is a cross-sectional view showing an aesthetic structural part 48 manufactured according to the method shown in FIG. 1. The aesthetic structural part 48 includes a decorative layer 30, a composite sheet layer 32 and multiple overmolded thermoplastic portions 34. The thermoplastic portions 34 include functional components 36, 38 and 40.

The decorative layer 30 may be, for example, a film or a foil. The decorative layer 30 may include one or more layers. The decorative layer 30 shown in FIG. 2 includes three layers: a top layer 42, a pigmented middle layer 44 and a bottom adhesion layer 46 which is in contact with the composite sheet layer 32. One or more layers of the decorative layer 30 may include metal particles. The decorative layer 30 may have a colored gloss appearance, such as a gloss black or gloss white or other colors. The color may be provided by a pigment included in the middle layer 44. The decorative layer 30 may have a metallized appearance such as chrome. In an embodiment, the decorative layer 30 includes a metal foil. In an embodiment, the decorative layer 30 is a polymer film containing embedded particles of metal.

The composite sheet layer 32 is a composite sheet thermoformed into a general shape for the part. The composite sheet layer 32 may include a resin and a fiber. The composite sheet layer 32 is a material that can be thermoformed. The resin may be a thermoplastic resin, such as acrylonitrile-butadiene-styrene (ABS), polycarbonate, acrylonitrile styrene acrylate (ASA), or other thermoplastic materials. The fibers may be, for example, carbon fibers, glass fibers, etc. The fibers may be continuous fibers. The fibers may be woven in a pattern or nonwoven. In an embodiment, multiple different types of resins and/or fibers may be used in the composite sheet. The composite sheet layer 32 may provide improved properties to the aesthetic structural part 48 such as impact resistance, wear resistance, and structural strength.

The overmolded thermoplastic portions 34 may be made of a thermoplastic material such as acrylonitrile-butadiene-styrene (ABS), polycarbonate, acrylonitrile styrene acrylate (ASA), etc. The overmolded thermoplastic portions 34 includes the functional components 36, 38, 40 such as a catch 40 for a latch or mounting features such as a screw-hole 36, a slot, a channel 38, etc. The overmolded thermoplastic portions 34 may cover some or all of one side of the composite sheet layer 32. In the embodiment shown in FIG. 2, the mounting features are a screw-hole 36, a slot or channel 38. The screw hole 36 may be threaded or not. The slot or channel 38 may have a size and shape selected to receive, for example, a tab or a flange. The catch 40 may have a size and a shape to receive a latch and secure the latch in place. Additional functional features may be included in the overmolded thermoplastic portions 34, based on the ability to injection-mold such functional features and the design requirements of the aesthetic structural part 48.

Figure 3A:
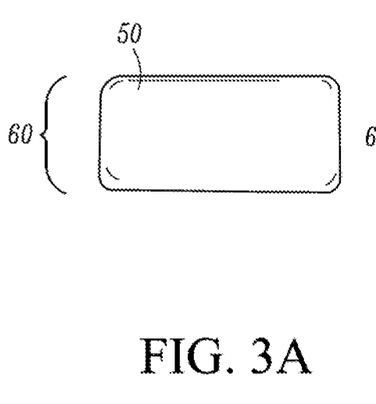
FIG. 3A shows a view of a front side of a finished aesthetic structural part.

FIG. 3A shows a front side 50 of a decorative and structural part 60. The front side 50 of the part YY can be designed to face outward of an enclosure when installed. For example, the front side 50 may face outwards from a transport refrigeration unit. The front side 50 presents a smooth surface, with an appearance based on the decorative layer applied to the part. For example, the front side 50 may have a gloss white, gloss black, or chrome finish, depending on the decorative layer used.

Figure 3B:
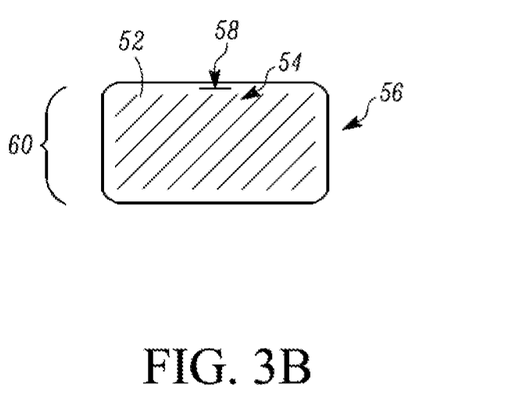
FIG. 3B shows a view of a back side of the finished structural part shown in FIG. 3A.

FIG. 3B shows a back side 52 of the decorative and structural part 60 of FIG. 3A. The back side 52 can be designed to face the inside of an enclosure when installed. For example, the back side 52 may face towards the internal components housed within a transport refrigeration unit. The back side 52 of the embodiment shown in FIG. 3B includes a portion 54 where the composite sheet is visible and not covered by overmolded thermoplastic material. The back side 52 of the embodiment shown in FIG. 3B includes overmolded section 56 around the perimeter of the decorative and structural part 60, which includes functional components such as a mounting feature 58, which may be a tab, a slot, a channel, a screw-hole, etc.

Figure 4:
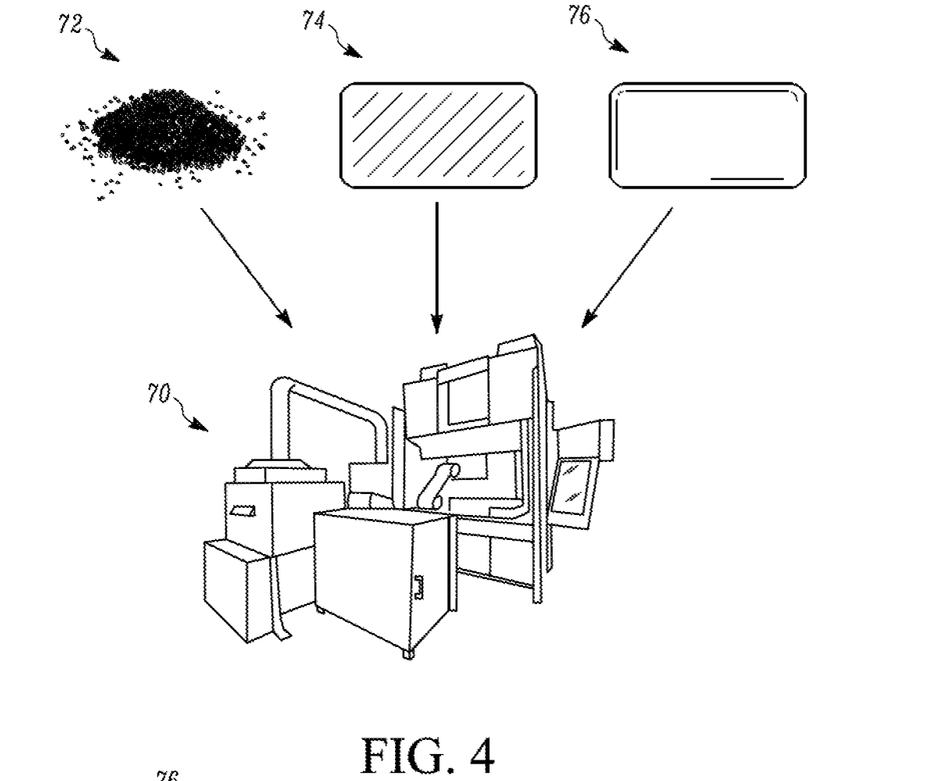
FIG. 4 is a diagram showing a machine for carrying out a method of manufacturing aesthetic structural plastic parts and the material inputs to the machine.

FIG. 4 shows a machine 70 capable of carrying out a method for forming an aesthetic structural part (e.g., the method shown in FIG. 1), and the inputs and outputs for such the machine 70 as it carries out the process.

The machine 70 is an injection molding machine which includes a heating element (not shown). The machine 70 may be used to carry out the entire manufacturing process. The heating element may be a standard heating element offered as a feature or an addition to the injection molding machine 70. The tooling used with the machine 70 may be specific to the part to be created. The tooling may include, for example, molds (not shown) for the injection molding of overmolded parts, one or more dies (not shown) on which the composite sheet is pressed during thermoforming, and a plate (not shown) to hold the decorative layer for application by hot-pressing.

The material used for the overmolded portion is a granulate of a thermoplastic 72. The granulate of a thermoplastic 72 may be a short fiber reinforced thermoplastic. The short fibers may be, for example, carbon, glass fibers, etc. The short fiber reinforced thermoplastic may also include, for example, acrylonitrile-butadiene-styrene (ABS), polycarbonate, acrylonitrile styrene acrylate (ASA), etc. The thermoplastic composite sheet 74 may be a composite of a thermoplastic resin with continuous fibers, for example glass and/or carbon fibers. The thermoplastic composite sheet may include a thermoplastic resin, such as acrylonitrile-butadiene-styrene (ABS), polycarbonate, or acrylonitrile styrene acrylate (ASA). The decorative layer 76 may be a decorative foil.

Figure 5A:
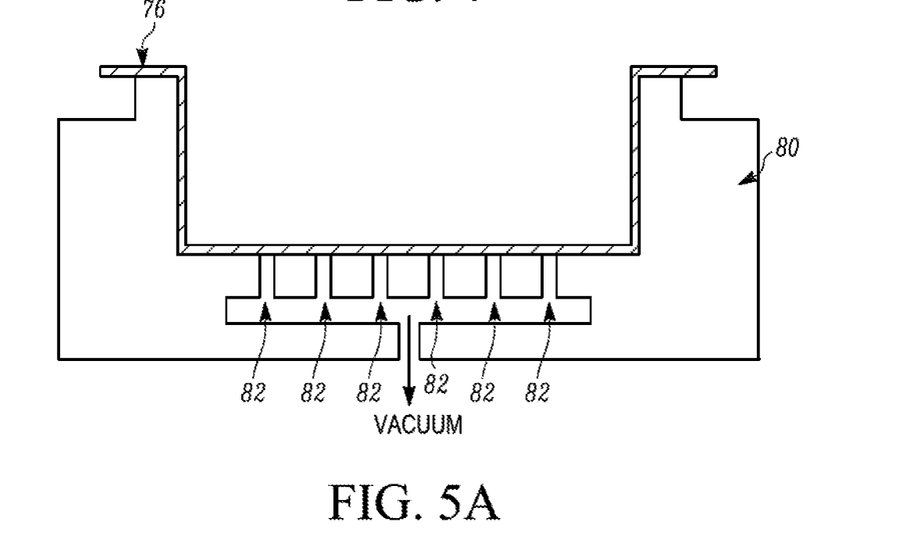
FIGS. 5A-5C are schematics of tooling and materials inside the machine of FIG. 4 during a process of manufacturing an aesthetic structural part.

FIG. 5A is a schematic of tooling and materials inside the machine of FIG. 4 during forming of a decorative film when manufacturing a structural aesthetic part. The decorative layer 76 is placed within first die 80. First die 80 may have one or more ports 82 through which a vacuum may be applied to form the decorative film to the shape of the first die.

Figure 5B:
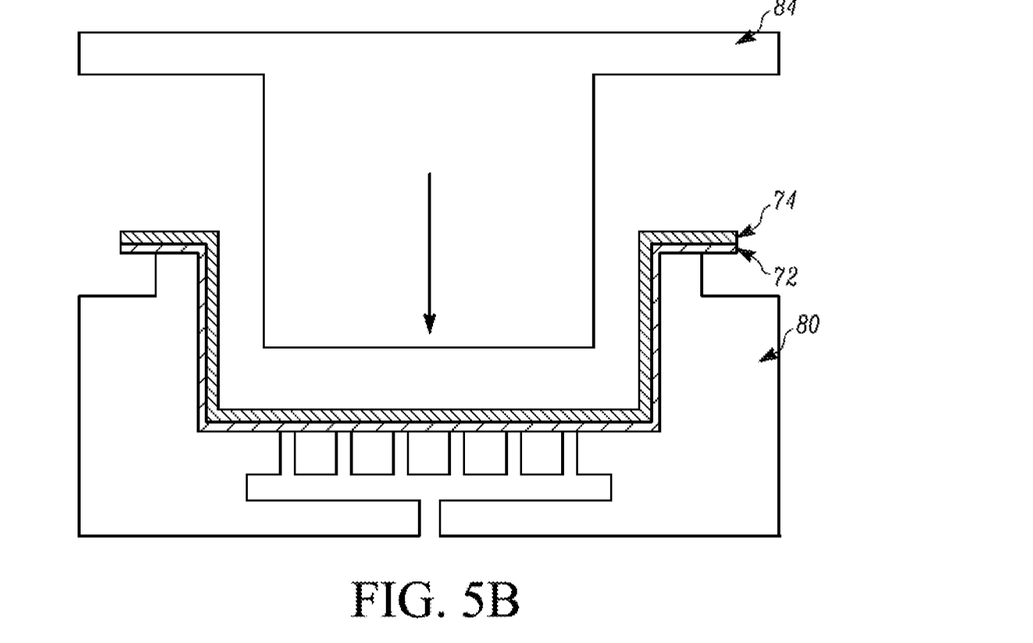

FIG. 5B is a schematic of tooling and materials inside the machine of FIG. 4 during thermoforming of a composite sheet when manufacturing a structural aesthetic part. Composite sheet 74 may be placed into the machine in which the decorative layer 76 is held in a first die 80. A second die 82 may be used to apply pressure and heat, pressing the composite sheet to the first die 80 and the decorative layer 76. The second die may be heated, for example to approximately 300° C., and the pressure applied by the second die may be, for example, between approximately 1000 psi and approximately 5000 psi. The first die 80 and/or the second die 84 may be heated by a heating element (not shown) included in the machine 70.

Figure 5C:
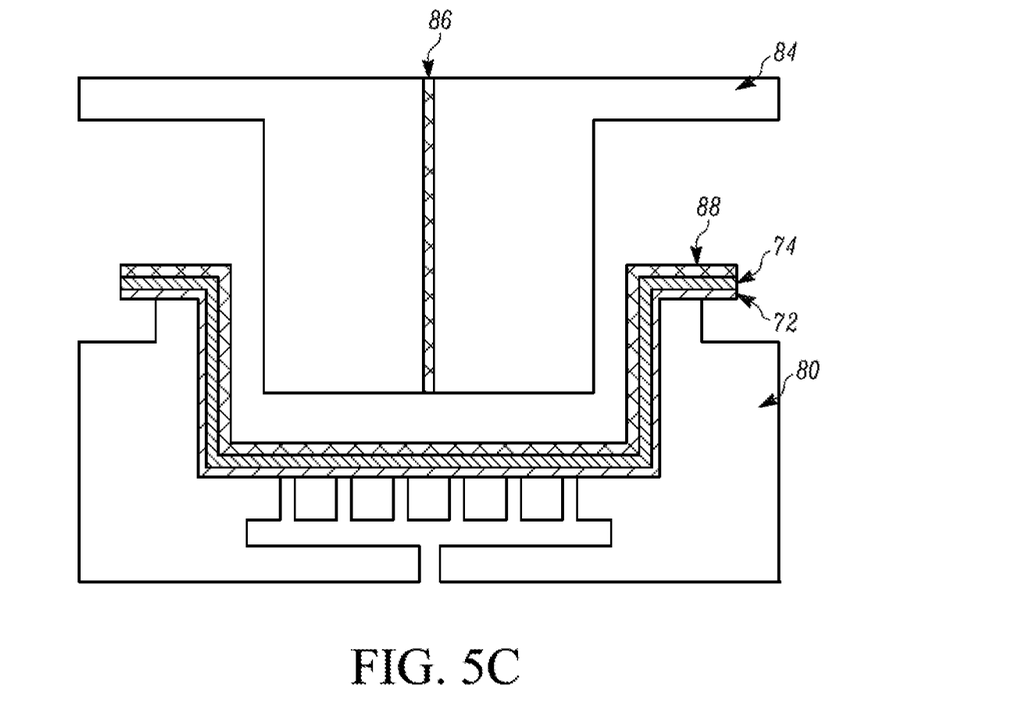

FIG. 5C is a schematic of tooling and materials inside the machine of FIG. 4 during overmolding when manufacturing a structural aesthetic part. The granulate of a thermoplastic 72 may be melted by a heating element (not shown) included in machine 70. The melted thermoplastic may be provided by one or more channels 86 in the second die 84, through which it is injected to the surface of a side of the composite sheet 74. The injected melted thermoplastic forms a layer of overmolded thermoplastic 88 on a side of the composite sheet 74 opposite the decorative layer 72. The overmolded thermoplastic 88 may be formed to include functional components such as ribs, bosses, catches for latches, slots, tabs, other mounting features, etc.

Figure 6:
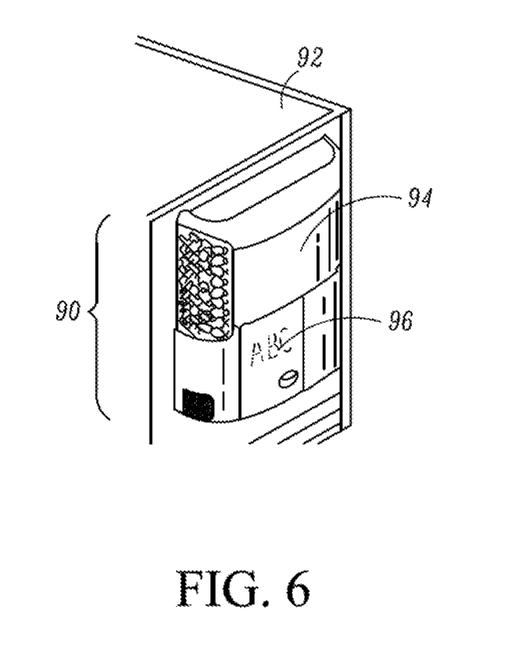
FIG. 6 shows a view of a transport refrigeration system including aesthetic structural parts.

FIG. 6 shows a transport refrigeration system including aesthetic structural parts. The transport refrigeration unit 90 is mounted on a trailer 92. The transport refrigeration unit 90 includes panels 94 and 96 in its housing. Panels 94 and 96 are aesthetic structural parts manufactured according to the method shown in FIG. 1. Panels 94 and 96 may be removable, fastened in place via functional components such as mounting features on the sides of the panels 94 and 96 that face inwards towards the transport refrigeration unit 90. Panels 94 and 96 may be movable, such as doors connected to the body of the transport refrigeration unit 90, for example via hinges screwed into mounting features included on the inward-facing sides of the panels 94 and 96, and fastened in a closed position via a functional component included on the inward-facing side of the panels 94 and 96, such as a hole receiving a bolt or a catch for a latch.

Aspects:

It is to be appreciated that any of aspects 1-13 may be combined with any of aspects 14-20.

Aspect 1. A method of manufacturing an aesthetic structural plastic part, comprising:
hot-stamping a decorative film to a thermoplastic composite sheet,
thermoforming the composite sheet, and
overmolding a thermoplastic material to the composite sheet.

Aspect 2. The method according to aspect 1, wherein the decorative film comprises a top layer, a pigmented layer and an adhesion layer; and wherein hot-stamping the decorative film to the thermoplastic composite sheet comprises placing the adhesion layer in contact with the thermoplastic composite sheet.

Aspect 3. The method according to aspect 1, wherein the decorative film is hot-stamped to a first side of the composite sheet and the thermoplastic material is overmolded onto a second side of the composite sheet.

Aspect 4. The method according to any of aspects 1-3, wherein the thermoplastic composite sheet includes a thermoplastic resin and fibers.

Aspect 5. The method according to aspect 4, wherein the fibers are carbon fibers.

Aspect 6. The method according to aspect 4, wherein the fibers are glass fibers.

Aspect 7. The method according to any of aspects 4-6, wherein a material forming the thermoplastic resin and a material forming the thermoplastic material each are the same.

Aspect 8. The method according to any of aspects 1-7, wherein overmolding a thermoplastic material to the composite sheet comprises forming one or more mounting features in the thermoplastic material.

Aspect 9. The method according to any of aspects 1-8, wherein the thermoplastic material comprises at least one of: acrylonitrile-butadiene-styrene, polycarbonate, or acrylonitrile styrene acrylate.

Aspect 10. The method according to any of aspects 1-9, wherein the thermoplastic material includes at least one of: acrylonitrile-butadiene-styrene, polycarbonate, or acrylonitrile styrene acrylate; and the thermoplastic composite sheet includes at least one of: acrylonitrile-butadiene-styrene, polycarbonate, or acrylonitrile styrene acrylate.

Aspect 11. The method according to any of aspects 1-10, wherein the hot-stamping, the thermoforming, and the overmolding are performed on an injection molding machine with a heating element.

Aspect 12. The method according to any of aspects 1-11, wherein thermoforming the composite sheet is performed before hot-stamping the decorative film to the thermoplastic composite sheet.

Aspect 13. The method according to any of aspects 1-12, wherein overmolding a thermoplastic material to the composite sheet is performed before hot-stamping the decorative film to the thermoplastic composite sheet.

Aspect 14. An aesthetic structural part, comprising:
a thermoplastic composite,
a decorative layer, and
a thermoplastic material, wherein the thermoplastic material has one or more functional components formed in the thermoplastic material.

Aspect 15. The aesthetic structural part according to aspect 14, wherein the decorative film includes a metallic particle.

Aspect 16. The aesthetic structural part according to any of aspects 14-15, wherein the thermoplastic composite includes at least one of: acrylonitrile-butadiene-styrene, polycarbonate, or acrylonitrile styrene acrylate.

Aspect 17. The aesthetic structural part according to any of aspects 14-16, wherein the thermoplastic material includes at least one of: acrylonitrile-butadiene-styrene, polycarbonate, or acrylonitrile styrene acrylate.

Aspect 18. The aesthetic structural part according to any of aspects 14-17, wherein the decorative layer is disposed on a first side of the thermoplastic composite and wherein the thermoplastic material is disposed on a second side of the thermoplastic composite.

Aspect 19. The aesthetic structural part according to any of aspects 14-18, wherein the one or more functional components include one or more mounting features.

Aspect 20. The aesthetic structural part according to aspect 20, wherein the mounting features include one or more screw holes.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method of manufacturing an aesthetic structural plastic part, comprising:
providing a thermoplastic composite sheet, wherein the thermoplastic composite sheet includes a thermoplastic resin and fibers;
providing a decorative film, wherein the decorative film includes a top layer, a pigmented middle layer, and a bottom adhesion layer;
hot-stamping the decorative film to the thermoplastic composite sheet, wherein the bottom adhesion layer is in contact with the thermoplastic composite sheet;
thermoforming the composite sheet, and overmolding a thermoplastic material to the composite sheet,
wherein overmolding a thermoplastic material to the composite sheet comprises forming one or more mounting features in the thermoplastic material, and
the aesthetic structural part includes the decorative film, the composite sheet, and the one or more mounting features.

2. The method of claim 1, wherein the decorative film is hot-stamped to a first side of the composite sheet and the thermoplastic material is overmolded onto a second side of the composite sheet.

3. The method of claim 1, wherein the thermoplastic composite sheet includes a thermoplastic resin and fibers.

4. The method of claim 3, wherein the fibers are carbon fibers.

5. The method of claim 3, wherein the fibers are glass fibers.

6. The method of claim 3, wherein a material forming the thermoplastic resin and a material forming the thermoplastic material are the same.

7. The method of claim 1, wherein the thermoplastic material comprises at least one of:
acrylonitrile-butadiene-styrene,
polycarbonate, or
acrylonitrile styrene acrylate.

8. The method of claim 1, wherein the thermoplastic material includes at least one of: acrylonitrile-butadiene-styrene,
polycarbonate, or
acrylonitrile styrene acrylate; and
the thermoplastic composite sheet includes at least one of:
acrylonitrile-butadiene-styrene,
polycarbonate, or
acrylonitrile styrene acrylate.

9. The method of claim 1, wherein the hot-stamping, the thermoforming, and the overmolding are performed on an injection molding machine with a heating element.

10. The method of claim 1, wherein thermoforming the composite sheet is performed before hot-stamping the decorative film to the thermoplastic composite sheet.

11. The method of claim 1, wherein overmolding the thermoplastic material to the composite sheet is performed before hot-stamping the decorative film to the thermoplastic composite sheet.

* * * * *